United States Patent [19]

Mehalla et al.

[11] Patent Number: 5,318,849

[45] Date of Patent: Jun. 7, 1994

[54] POLYOLEFIN RUBBERS AND PROCESS FOR THEIR PREPARATION

[75] Inventors: Hacene Mehalla, Essars; Brigitte Morese-Seguela, Hinges; Patrice Breant, Robecq, all of France

[73] Assignee: Sofrapo-Commerciale, Courbevoie, France

[21] Appl. No.: 720,770

[22] PCT Filed: Nov. 8, 1990

[86] PCT No.: PCT/FR90/00801

§ 371 Date: Jul. 29, 1991

§ 102(e) Date: Jul. 29, 1991

[87] PCT Pub. No.: WO91/07447

PCT Pub. Date: May 30, 1991

[30] Foreign Application Priority Data

Nov. 8, 1989 [FR] France .................. 89 14681

[51] Int. Cl.⁵ .................. B32B 25/04; C08F 210/08
[52] U.S. Cl. .................. 428/407; 428/402; 428/447; 428/523; 526/73; 526/116; 526/125; 526/151; 526/159; 526/165; 526/169; 526/169.1; 526/169.2; 526/348; 526/348.6; 525/342; 525/387; 204/59 QM; 204/242
[58] Field of Search .................. 526/348, 901, 348.6, 526/159, 169.2, 144, 151, 125, 169, 169.1; 428/402, 407, 447, 523; 525/342, 387

[56] References Cited

U.S. PATENT DOCUMENTS 3,173,903  3/1965  Lukach et al. .............. 526/169.2 X

FOREIGN PATENT DOCUMENTS

| 0016707A2 | 1/1980 | European Pat. Off. . |
| 0041423A3 | 9/1981 | European Pat. Off. . |
| 0053956A1 | 6/1982 | European Pat. Off. . |
| 0141597A1 | 5/1985 | European Pat. Off. . |
| 0175000A1 | 3/1986 | European Pat. Off. . |
| 2439211 | 6/1980 | France . |
| 2053246A | 2/1981 | United Kingdom . |

*Primary Examiner*—Fred Teskin
*Attorney, Agent, or Firm*—Finnegan, Henderson, Farabow, Garrett & Dunner

[57] ABSTRACT

Polyolefin rubber which is an ethylene/propylene and/or 1-butene copolymer, which has a melt index of 0.3 to 15 dg/min and a relative density of 0.860 to 0.885, comprising 74-91 mol % of units derived from ethylene and 9-26 mol % of units derived from propylene and/or from 1-butene, characterised by a crystalline melting point J of 100° to 125° C. The process for obtaining this rubber consists in copolymerising, at a temperature of 150°-300° C. and at a pressure of 400-2000 bars, a gas stream containing 15-42% by vol. of ethylene and 58-85% by vol. of propylene and/or 1-butene, in the presence of a Ziegler-type catalyst system comprising at least one compound of a transition metal of groups IVB, VB, VIB and VIII of the Periodic Classification, and at least one organoaluminium compound and, if appropriate, in the presence of at least one chain transfer agent. Manufacture of articles such as seals, shoe components, flexible tubing, damping components, profiles for buildings and motor vehicles, and the like.

9 Claims, 2 Drawing Sheets

POLYOLEFIN RUBBERS AND PROCESS FOR THEIR PREPARATION

The present invention relates to a new class of polyolefin rubbers and to a process for their preparation.

There are already known polyolefin rubbers consisting of copolymers of ethylene and of alpha-olefin which have a density of between 0.860 and 0.885. The alpha-olefin chosen for the constitution of these polyolefin rubbers is generally propylene or 1-butene. Various processes for obtaining such polyolefin rubbers are also known. It has already been noted that, owing to its characteristics, each process produces a class of polyolefin rubbers which have a particular macromolecular structure and are particularly suited to being employed efficaciously in some particular application or other.

As is well known to specialists in polyolefin rubbers, the parameters to be taken into consideration in order to define their macromolecular structure completely are:
- the melt index,
- the density,
- the number-average molecular mass Mn,
- the average geometric molecular mass Mg,
- the polydispersity index Mw/Mn (ratio of the weight-average mass to the number-average mass),
- the Mooney viscosity,
- the molar proportion of alpha-olefin(s),
- the crystalline melting point (determined by differential thermal analysis),
- the degree of residual crystallinity (determined by X-rays).

Thus, a first class of polyolefin rubbers is known, which are marketed by the company Montedison under the trademark Dutral ®, consisting of copolymers of 65 to 80 mol % of ethylene and from 20 to 35 mol % of propylene, which have a relative density of 0.850 to 0.870, containing no residual crystallinity and therefore having no crystalline melting point, and which have an average geometric molecular mass of 90 to 100 kg/mole and a polydispersity index of between 2.2 and 2.9. A second class of polyolefin rubbers is also known, which are marketed by the company Mitsui under the trademark Tafmer ®, consisting of copolymers of 78 to 92 mol % of ethylene and from 8 to 22 mol % of an alpha-olefin chosen from propylene and 1-butene, which have a relative density of 0.860 to 0.890, a residual crystallinity of 1 to 14%, a crystalline melting point J of 75° C. and an average geometric molecular mass of 60 to 120 kg/mole and a polydispersity index of between 2.2 and 2.7.

Furthermore, the utility value of polyolefin rubbers, especially their suitability for being employed in some applications such as especially the insulation and filling of low-voltage to high-voltage electrical cables and the manufacture of flexible products such as tubing or shoe components, is generally measured by the following properties, after crosslinking with a peroxide system:
- elongation at break,
- tensile strength,
- Shore A hardness,
- Mattia flexure.

The problem which the present invention aims to solve consists in improving the property compromise of polyolefin rubbers when compared with the properties of those known at present, especially by improving, at a given density, the elongation at break and the Mattia flexure after crosslinking.

Thus, the first subject of the present invention is a polyolefin rubber consisting of an ethylene/propylene and/or 1-butene copolymer, which has a melt index of approximately between 0.3 and 15 dg/min and a relative density of approximately between 0.860 and 0.885, comprising from 74 to 91 mol % of units derived from ethylene and from 9 to 26 mol % of units derived from propylene and/or 1-butene, characterised by a crystalline melting point J of approximately between 100° and 125° C. Subsidiarily, the polyolefin rubber according to the invention may be characterised by at least one of the following features:
- a polydispersity index of approximately between 3.5 and 15, preferably approximately between 4 and 8,
- an average geometric molecular mass (defined as shown hereinafter) of approximately between 35 and 70 kg/mole,
- a relationship between the relative density d and the content x (expressed in mol %) of units derived from propylene and from 1-butene, which is expressed by the double equation:

$$0.9084 \leq d + 0.002\,x \leq 0.918$$

a degree of residual crystallinity (determined according to the method described hereinafter) of approximately between 2 and 15%.

As used in the present invention, the crystalline melting point J means the temperature determined at the maximum of the melting curve after crystallisation obtained by subjecting the copolymer sample to the following three-stage process:
- melting at the rate of 8° C. per minute from 10° C. to 150° C., then
- crystallisation at the rate of 8° C. per minute from 150° C. to 10° C., then again
- melting at the rate of 8° C. per minute from 10° C. to 150° C.

The degree of residual crystallinity according to the present invention is determined by X-ray diffraction, on a copolymer sample which has been subjected to cooling at the rate of 5° C. per hour from 190° C. to room temperature.

The average geometric molecular mass is defined, according to the present invention, by the mathematical relationship:

$$\log_{10} Mg = \sum_{i=1}^{i=M} W_i \log_{10} M_i$$

where $W_i$ is the weight fraction of substance of mass $M_i$ and N is the number of fractions eluted using gel permeation chromatography.

As can be easily appreciated, the density of the copolymer according to the invention is proportionately higher the higher the content of units derived from ethylene.

Figure 1:
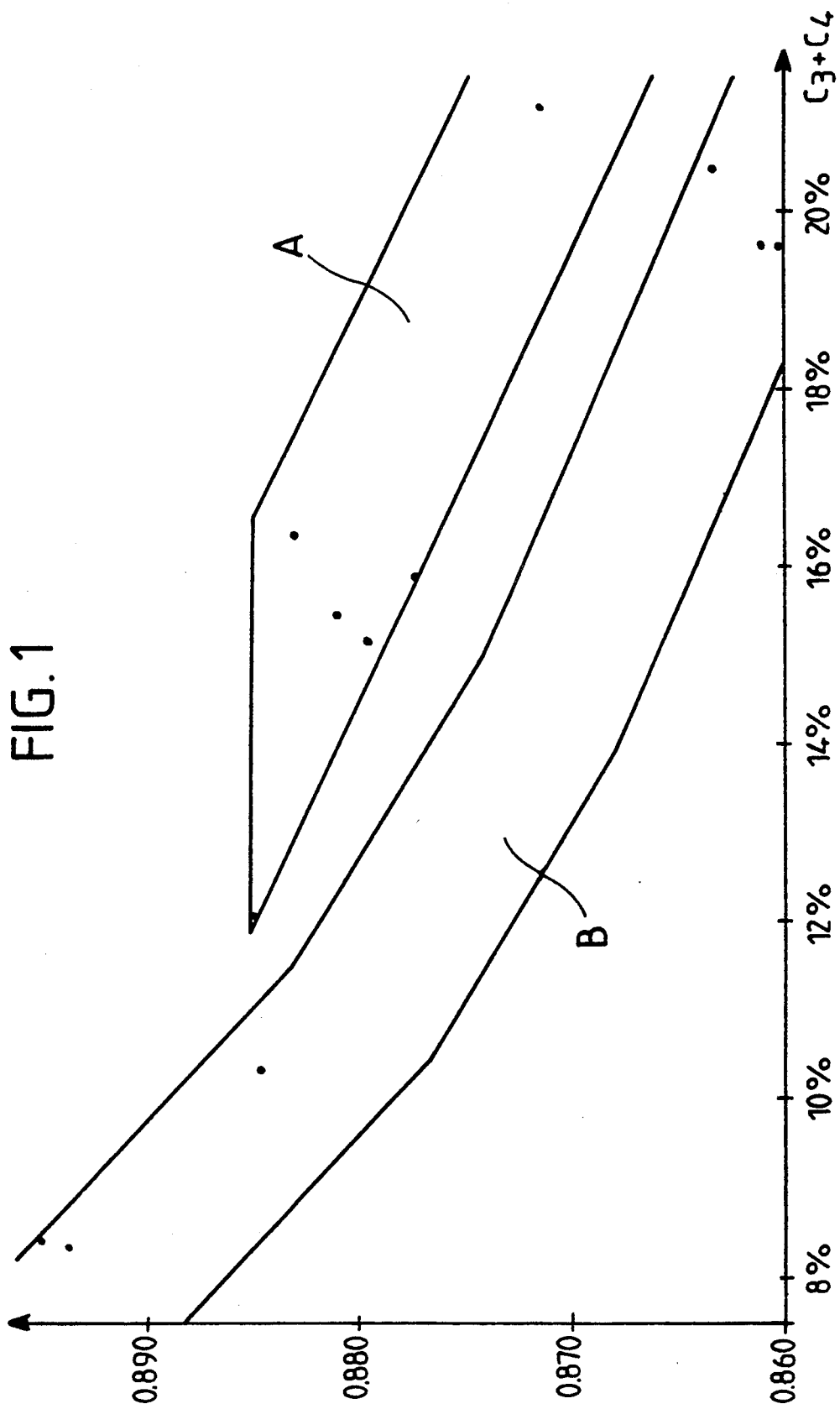
FIG. 1 illustrates the respective regions of the relationship between the relative density, d, of the copolymer and of the content, x, of the units derived from propylene and/or from 1-butene in the copolymers of the present invention (region A), and of the copolymer marketed by Mitsui under its trademark TAFMER ® (region B).

The copolymer according to the invention may contain units derived from propylene and units derived from 1-butene simultaneously. Their simultaneous presence in the polyolefin rubber also makes it possible to ensure the improvement in the property comprise which is sought by the present invention. Their respective properties may vary within wide limits while attaining this objective.

The distinctive feature of the copolymers according to the invention when compared with the known polyolefin rubbers described above lies in their crystalline melting point J which is notably higher and, incidentally, in their greater polydispersity. In addition, the copolymers according to the invention can be distinguished from the polyolefin rubbers marketed under the Dutral ® trademark by their notably lower average geometric molecular mass.

On leaving its production unit, the polyolefin rubber according to the invention may be packed in various forms, in particular as pellets, granules, blocks or loaves. When it is packed in the form of small-sized pellets or granules (for example approximately 1 to 5 mm), it is preferable, to make them easier to cut and convey, to coat their surface with a silicone oil or a nonionic surface-active agent such as a copolymer of propylene oxide and ethylene oxide. In this case a sufficient quantity of coating agent is generally approximately between 0.02% and 0.05% by weight relative to the rubber. In addition, when it is desired to prevent the rubber (packed in the form of small-sized pellets or granules) from setting solid after a prolonged storage period, it may be necessary to raise the quantity of coating agent to approximately 0.5% relative to the rubber or else to mix the rubber with up to 10%, preferably at least 4%, by weight of a fatty acid or of a fatty acid salt, such as stearic acid, and this imparts a perfect pourability to the rubber even after 4 months' storage. The coating may be carried out by dry blending or else by spraying, or by a wet route by adding the coating agent, in a proportion of 0.5 to 5% in water, to the water for cooling the pellets or granules leaving the production unit. In this last case it is generally preferable that the cooling water should be at a temperature of at least 35° C. and at a pH of approximately between 8 and 11.

The second subject of the present invention is a process for obtaining the polyolefin rubber defined above, consisting in copolymerising, at a temperature approximately from 150° to 300° C. and at a pressure approximately of 400 to 2000 bars, a gas stream containing approximately 15 to 42% by volume of ethylene and approximately from 58% to 85% by volume of propylene and/or 1-butene, in the presence of a catalyst system of the Ziegler type comprising, on the one hand, at least one compound of a transition metal of groups IVB, VB, VIB and VIII of the Periodic Classification and, on the other hand, at least one organoaluminium compound and, if appropriate, in the presence of at least one chain transfer agent. The catalyst system may additionally include at least one aluminium and/or magnesium halide. In order to reach the copolymers which have the characteristics described above, and in which the molar ratio of units derived from propylene/units derived from 1-butene exceeds 0.5, the composition of the gas stream subjected to the copolymerisation will preferably be such that the volume ratio of propylene/1-butene exceeds approximately 0.3, depending on the nature of the catalyst system employed. The choice of the latter, in fact, has an influence, known to a person skilled in the art, on the relative reactivity of ethylene, propylene and 1-butene in the copolymerisation, and consequently on the tendency to incorporate preferentially units derived from propylene or else units derived from 1-butene into the macromolecular chain.

Catalyst systems of the Ziegler type comprising, on the one hand, at least one compound of the transition metal groups IVB, VB, VIB and VIII of the Periodic Classification and, on the other hand, at least one organoaluminium compound, which are suitable for the selective copolymerisation of ethylene and of propylene or of 1-butene, at elevated pressure, are already known to people skilled in the art. They include, especially but not exclusively, those described in Patents EP-A-032,339, EP-A-0,053,956, U.S. Pat. No. 4,396,532, FR-A-2,342,306, FR-A-2,400,040, EP-A-0,070,749 and EP-A-0,072,717, whose detailed description is incorporated here by reference.

Some catalyst systems of the Ziegler type which are suitable for the copolymerisation of ethylene with propylene or 1-butene at low pressure, such as, for example, that described in Patent FR-A-2,265,778, can also be suitable for using the process according to the present invention. Lastly, new catalyst systems of the Ziegler type have been found particularly suitable for the selective copolymerisation of ethylene, propylene and 1-butene at elevated pressure.

Thus, first of all, these include a catalyst comprising at least one titanium compound and at least one halogenated organoaluminium compound, in suspension in at least one α,ω-dihaloalkane, characterised in that the titanium compound is essentially a titanium(III) compound, the overall titanium(II) and titanium(IV) content being lower than or equal to 15% of the total titanium content, and in that it additionally comprises at least one inorganic magnesium compound in the form of suspension.

In such a catalyst:
the halogenated organoaluminium compound has the general formula $X_2Al(CH_2)_nAlX_2$ in which X is a halogen, preferably chlorine, and n is between 1 and 10.
The α,ω-dihaloalkane has the general formula X-$(CH_2)_n$-X' in which each of X and X', which are identical or different, is a halogen atom, such as chlorine, bromine and fluorine, and n is an integer from 1 to 10, preferably from 1 to 6. The nature of the halogen atoms and the value of n are such that the α,ω-dihaloalkane is liquid under normal temperature and pressure conditions. Among the compounds corresponding to the above general formula those advantageously chosen are dichloromethane, 1,2-dichloroethane, 1,4-dichlorobutane, or their mixtures.
An inert solvent may be present simultaneously with the α,ω-dihaloalkane. This solvent is preferably chosen from saturated aliphatic or cycloaliphatic hydrocarbons containing from 6 to 14 carbon atoms, whose boiling point at atmospheric pressure is not lower than 60° C., and their mixtures. It may be, for example, a $C_{10}$–$C_{12}$ saturated aliphatic hydrocarbon cut. The inert solvent is employed in a quantity which can be up to 100 parts by weight per 100 parts by weight of halogenated solvent.
The oxidation state of the titanium compound is determined by redox determination in three parts, the first making it possible to calculate $Ti^{2+}+Ti^{3+}$, the second $2Ti^{2+}+Ti^{3+}$, with the content of compounds of titanium of valency II being therefore obtained by difference, and the third $Ti^{2+}+Ti^{3+}+Ti^{4+}$ (total quantity of titanium which allows the content of $Ti^{4+}$ compound to be deduced therefrom).

Inorganic magnesium compound means a magnesium salt of inorganic acid, such as a halide, advantageously magnesium chloride, preferably anhydrous.

A vanadium compound, advantageously of valency III, such as $VCl_3$, may also be present simultaneously with the titanium compound.

The atomic ratio Cl/Ti is advantageously between 10 and 180, preferably between 20 and 60.

The atomic ratio Al/Ti is advantageously between 0.5 and 12, preferably between 3 and 6.

The atomic ratio Mg/Ti is advantageously between 1 and 15, preferably between 3 and 8.

The atomic ratio V/Ti is advantageously between 0 and 6, preferably between 0 and 3.

An α-olefin containing, for example, from 4 to 16 carbon atoms may be present, if appropriate in an at least partially polymerised state.

Such a catalyst may be prepared, for example, by mixing its constituents, it being possible for the halogenated organoaluminium compound to have been prepared in accordance with Patent U.S. Pat. No. 3,787,383. It may also be prepared by a process simultaneously comprising an at least partial electrochemical oxidation of aluminium in an α,ω-dihaloalkane and an electrochemical reduction of a titanium(IV) compound. In such a process the simultaneous electrochemical oxidation and reduction take place in an electrolysis cell while an electrical current is passed between an anode and a cathode which are immersed in the electrolyte comprising the halogenated solvent, to which an inert solvent has been added if appropriate, and the titanium-(IV) compound. Owing to its constitution, this electrolyte is relatively nonconductive; however, it is possible to increase its conductivity by adding to it at least one higher olefin in quantities which may be up to 10 times the quantity of the titanium(IV) compound (expressed in moles). An α-olefin containing, for example, from 4 to 16 carbon atoms, advantageously 1-hexene, may be employed for this purpose.

This process is carried out at a temperature of between 0° C. and the boiling point of the solvent (halogenated and, if appropriate, inert) or else that of the α-olefin. Since the electrolysis is exothermic, a device for cooling the reaction mixture should be provided and, if appropriate, an electrolysis cell which can operate with a slight overpressure (to approximately 2 bars).

The titanium(IV) compound subjected to electrochemical reduction is chosen from the compounds of general formula $Ti(OR)_nX_{4-n}$ in which X is a halogen atom chosen from fluorine, chlorine, bromine and iodine, R is an alkyl radical containing from 1 to 10 carbon atoms, and $0 \leq n \leq 4$. The titanium(IV) compound is advantageously titanium tetrachloride, dichlorodiethoxytitanium or dichlorodi-n-butoxytitanium. The concentration of titanium(IV) in the reaction mixture is advantageously between 20 and 600 millimoles per litre. Although a high concentration presents problems of conductivity and of diffusion of the species in a medium whose viscosity is increased, on the other hand it makes it possible to reduce the molar ratio of halogenated solvent/titanium in the catalyst obtained and thus to avoid the disadvantages of the presence of an excessively large quantity of halogenated compound during the polymerisation. A vanadium(IV) or vanadium(V) compound chosen from the compounds of general formula $VO(OR)_mX_{3-m}$ in which X is a halogen, R is an alkyl radical containing from 1 to 6 carbon atoms and $0 \leq m \leq 3$, and the compounds of formula $VX_4$ in which X is a halogen, may be added to the reaction mixture during the electrolysis. Examples of such compounds are $VCl_4$ and $VOCl_3$. The concentration of vanadium compound in the reaction mixture is advantageously between 0 and 100 millimoles per liter.

Analyses carried out on the reaction mixture after electrochemical oxidation-reduction under various conditions have shown that, surprisingly, whatever the quantity of electricity which has passed through the reaction mixture, the titanium(IV) derivative is not reduced beyond the degree of oxidation of (III). It has thus been found that it is possible to pass the quantity of current necessary for generating the halogenated organoaluminium compound without changing the degree of oxidation of the titanium(III) compound obtained. The simultaneous electrochemical oxidation and reduction are thus advantageously carried out by passing through the reaction mixture a quantity of electricity of between 1 and 12 faradays per mole of titanium, preferably between 1 and 8 faradays per mole of titanium.

The process may be carried out by any one of the three traditional electrochemical methods: applied cathode voltage, regulated cathode voltage or constant current.

Electrochemical oxidation-reduction at applied cathode voltage is carried out with a device comprising a reference electrode (for example Ag/AgCl/Cl), a working electrode (cathode) and an aluminium soluble auxiliary electrode (anode). A constant voltage is applied between the reference electrode and the cathode; the voltage stabiliser connected between cathode and anode then delivers the working voltage. The applied constant voltage is between −0.5 and −1 volt.

The regulated cathode voltage route consists in establishing a given working voltage between cathode and anode without any reference electrode being employed. It has been found that the desired reactions (dissolution of the aluminium anode and reaction with the halogenated solvent, reduction of the titanium(IV) derivative at the cathode) are possible without the titanium(III) derivative obtained being reduced further at the cathode. It is thus possible to operate at a regulated cathode voltage of between 20 and 200 volts. The passage of a first faraday per mole of titanium reduces the titanium-(IV) derivative to titanium(III) derivative and supplies, per gram-atom of titanium, one gram-equivalent of aluminium in the form of halogenated organoaluminium derivative. The passage of the following faradays enables the quantity of halogenated organoaluminium derivative to be increased without reduction of the titanium(III) compound formed.

Oxidation-reduction at constant current consists in predetermining the value of the current which will pass through the electrolyte, a controlling device deducing therefrom instantaneously the value of the voltage difference to be applied between anode and cathode so as to keep the current at the chosen value. In the present case the operation is advantageously carried at a current of between 100 mA and 100 A.

The process is carried out in an electrolysis cell whose cathode consists of a metal (generally a metal basket) chosen especially from platinum, iron, aluminium and their corresponding alloys. The cathode may consist of the electrolysis cell itself, which is then made of metal. The aluminium or aluminium-based alloy anode is then arranged near the inner wall of the cell. If both the anode and cathode are made of aluminium or aluminium alloy, the electrolysis can then be carried out using alternating current.

Secondly, among the new catalyst systems of the Ziegler type which are suitable for the selective copolymerisation of ethylene, propylene and 1-butene at elevated pressure, there may be mentioned a catalyst comprising at least one titanium compound, at least one halogenated organoaluminium compound and at least one inorganic magnesium compound in suspension in at least one $\alpha,\omega$-dihaloalkane, characterised in that the titanium compound is essentially a titanium(III) compound, the overall titanium(II) and titanium(IV) content being lower than or equal to 15% of the total titanium content. In such a catalyst the determination of the valency states of the titanium is carried out by means of a three-part redox determination. The first part makes it possible to calculate the content of ($Ti^{2+}+Ti^{3+}$); it consists in oxidising $Ti^{2+}$ to $Ti^{3+}$ by means of protons introduced in the form of a 2N HCl solution prepared in degassed distilled water. The $Ti^{3+}$ formed plus the $Ti^{3+}$ present originally are then oxidised to $Ti^{4+}$ by means of an excess of 0.2N $Fe^{3+}$ solution. $Fe^{3+}$ is reduced to $Fe^{2+}$, which is determined using potassium dichromate in a sulphuric-phosphoric medium in the presence of 0.2% sodium diphenylaminesulphonate. The quantity of $Fe^{2+}$ which is thus determined corresponds to the $Ti^{2+}+Ti^{3+}$ ions originally present in the catalyst. The second part makes it possible to calculate the content of $2Ti^{2+}+Ti^{3+}$. It consists in oxidising $Ti^{2+}$ and $Ti^{3+}$ by means of an excess of a solution of $Fe^{3+}$ ions, in the absence of protons to avoid the oxidation of $Ti^{2+}$ to $Ti^{3+}$, according to the reactions:

$$Ti^{2+}+2Fe^{3+}\rightarrow Ti^{4+}+2Fe^{2+}$$

and $Ti^{3+}+Fe^{3+}\rightarrow Ti^{4+}+Fe^{2+}$.

The determination of the $Fe^{2+}$ ion is then performed using potassium dichromate as above. The value obtained corresponds to the sum $2Ti^{2+}+Ti^{3+}$ present in the catalyst. The third part makes it possible to determine the $Ti^{4+}$ content by reduction, by means of triethylaluminium in an atomic ratio Al/Ti equal to 6, of the titanium(IV) present into titanium(III) and titanium(II). The determination is then carried out according to the first part above, the value found for $Ti^{2+}+Ti^{3+}$ corresponding to the sum $Ti^{2+}+Ti^{3+}+Ti^{4+}$ of the ions present in the catalyst component analyzed and consequently to the total titanium content. The various percentages are calculated by solving the following system of equations:

$$Ti^{2+}+Ti^{3+}=A$$

$$2Ti^{2+}+Ti^{3+}=B$$

$$Ti^{2+}+Ti^{3+}+Ti^{4+}=C$$

The trihalides $TiX_3$, advantageously the trichloride $TiCl_3$ may be especially mentioned among the titanium compounds which may be present in this catalyst.

This catalyst may additionally include at least one vanadium compound in the form either of the trihalide $VX_3$, for example the trichloride $VCl_3$, of the tetrahalide $VX_4$, for example of the tetrachloride $VCl_4$, of the oxytrihalide $VOX_3$, for example the oxytrichloride $VOCl_3$, or of vanadyl haloester of formula $VO(OR)_nX_{3-n}$ in which X is a halogen, preferably chlorine, R is an alkyl radical containing from 1 to 6 carbon atoms and n is between 1 and 3. The vanadium is preferably present in the valency state (III) and/or (IV).

The magnesium compound present in suspension form in this catalyst is advantageously a magnesium halide, preferably anhydrous, for example anhydrous magnesium chloride.

This catalyst may be obtained by a process comprising, in a first stage, the reduction of a titanium(IV) compound in an $\alpha,\omega$-dihaloalkane by means of a molar excess of at least one halogenated organoaluminium compound, in the absence of an ether, characterised in that it comprises, in a second stage, the addition to the reaction mixture of a compound capable of forming a magnesium halide in situ without additional reduction of the titanium compound obtained during the first stage.

The titanium(IV) compound to be reduced advantageously has the general formula $Ti(OR)_nX_{4-n}$ in which X is a halogen, R is an alkyl radical containing from 1 to 10 carbon atoms, and $0\leq n\leq 4$. Titanium tetrachloride $TiCl_4$ is preferably employed.

A vanadium(III), (IV) or (V) compound may be added to the titanium(IV) compound before, during or after reduction. Its general formula is $VX_3$, $VX_4$ or $VO(OR)_mX_{3-m}$, in which X is a halogen, preferably chlorine, R is an alkyl radical containing from 1 to 6 carbon atoms, and $0\leq m\leq 3$. The pentavalent vanadium compound advantageously contains at least one chlorine atom. For example, the oxytrichloride $VOCl_3$ is employed for an addition before reduction, $VCl_3$ for an addition after reduction of the titanium(IV) compound.

The $\alpha,\omega$-dihaloalkane employed as suspension medium for this catalyst has the general formula $X-(CH_2)_n-X'$, in which each of X and X', which are identical or different, is a halogen atom, such as chlorine, bromine and fluorine, and n is an integer from 1 to 10, preferably from 1 to 6. The nature of the halogen atoms and the value of n are such that the $\alpha,\omega$-dihaloalkane is liquid under normal temperature and pressure conditions. Among the compounds corresponding to the above general formula those advantageously chosen are dichloromethane, 1,2-dichloroethane, 1,4-dichlorobutane and their mixtures.

The halogenated organoaluminium compound employed for reducing the titanium(IV) compound is chosen from:

the compounds of general formula $R_nAlX_{3-n}$ in which R is an alkyl radical containing from 1 to 4 carbon atoms, X is a halogen and $1\leq n\leq 2$. For example, dichloroethylaluminium, chlorodiethylaluminium and their mixtures will be mentioned.

the compounds of general formula $X_2Al(CH_2)_nAlX_2$ in which X is a halogen atom and $1\leq n\leq 8$. They may be obtained by reaction of aluminium with an $\alpha,\omega$-dihaloalkane. For example, the compounds of formula $Cl_2AlCH_2AlCl_2$ and $Cl_2Al(CH_2)_2AlCl_2$ will be mentioned.

The process may be carried out additionally in the presence of an inert solvent advantageously chosen from saturated aliphatic or cycloaliphatic hydrocarbons whose boiling point at atmospheric pressure is not lower than 60° C. This may be especially a saturated aliphatic or cycloaliphatic hydrocarbon containing from 6 to 14 carbon atoms, for example a $C_{10}$-$C_{12}$ saturated aliphatic hydrocarbon cut. The quantity of inert solvent is chosen in order that the catalyst obtained may be in the form of a suspension which can be handled.

The process may also be carried out in the presence of at least one α-olefin containing at least 4 carbon atoms, in order to promote the activity of the active centres of the catalyst. The α-olefin employed may be advantageously 4-methyl-1-pentene, 1-hexene, 1-octene or 1-decene, in a quantity which may be up to 10 times the molar quantity of titanium(IV) compound.

An organomagnesium derivative of formula R—Mg—R′, in which R and R′, which are identical or different, are alkyl radicals containing from 1 to 12 carbon atoms may be especially mentioned as a compound capable of forming a magnesium halide in situ. n-Butylethyl magnesium or n-butyl-n-octylmagnesium or their mixtures are advantageously employed.

The process may be carried out in a stirred reactor at a temperature of between 0° and 80° C. The usual precautions are taken to prevent losses of volatile products, the operation being carried out at a suitable pressure. The presence of an α,ω-dihaloalkane in the reaction mixture has the effect of promoting the reduction of the titanium(IV) compound essentially as far as a titanium(III) compound, whereas if the α,ω-dihaloalkane is absent, the formation of titanium(II) compound is very considerable.

The relative proportions of the various reactants used in the process are as follows, expressed as molar ratios:

α,ω-dihaloalkane/titanium compound and, if appropriate, vanadium compound: advantageously between 5 and 180, preferably between 8 and 60;

halogenated organoaluminium compound/titanium compound and, if appropriate, vanadium compound: higher than 1; it is preferably lower than or equal to 6;

compound capable of forming a magnesium halide in situ/titanium compound and, if appropriate vanadium compound: advantageously between 1 and 15, preferably between 1 and 6;

vanadium compound/titanium compound: advantageously lower than or equal to 6, preferably lower than or equal to 3, still more preferably between 0 and 1;

halogenated organoaluminium compound/compound capable of forming a magnesium halide in situ: advantageously between 0.3 and 2, preferably between 0.5 and 1.5.

The two catalysts just described may additionally comprise an organometallic activator of groups I to III of the Periodic Classification. The activator is advantageously chosen from the trialkylaluminiums $AlR_3$, the tetraalkylaluminoxanes RR′Al—O—AlR″R‴, the monoalkylsilanolatodialkylaluminiums RSiH$_2$—O—AlR′R″ and their mixtures, the alkyl radicals R, R′, R″ and R‴, which are identical or different, containing from 1 to 12 carbonatoms. For example, triethylaluminium, tri-n-butylaluminium, tri-n-octylaluminium, tetraisobutylaluminoxane, methylsilanolatodiisobutylaluminium and their mixtures will be mentioned.

The activator is generally employed in a quantity of up to 100 times the molar quantity of transition metal compound.

In a manner which is known per se, and whatever the catalyst system of the Ziegler type employed, the copolymerisation of ethylene, propylene and/or 1-butene in the process according to the invention may be carried out:

in the presence of a gas which is inert towards olefins, such as nitrogen, propane or butane, in a proportion of up to approximately 50% by volume relative to the monomers;

in the presence of at least one chain transfer agent such as hydrogen in a sufficient quantity, for example up to approximately 2 mol % relative to the olefins, to modify the molecular weight and the melt index of the terpolymer;

by introducing into the stream of the unreacted recycled monomers a deactivator of the catalyst system such as described in Patents EP-A-116,797, EP-A-116,248 and EP-A-115,233;

continuously, in at least one autoclave or tubular reactor comprising one or more reaction zones operating at temperatures which are different if appropriate, in which the average residence time of the monomers is approximately between 1 and 150 seconds. If appropriate, two reactors operating in parallel may be employed, in a configuration such as that of Patent EP-0,013,229.

When an autoclave reactor comprising at least two reaction zones is employed, the monomers delivered by the high-pressure compressor are preferably fed towards a first zone whose temperature is controlled at a level which is lower than that of the subsequent zone(s).

The process according to the invention makes it possible to obtain, with good catalyst efficiencies, copolymers which have the macromolecular structure parameters defined above and which after crosslinking are well suited for applications such as especially the insulation and filling of low-voltage to high-voltage electrical cables and the other applications referred to below.

A further subject of the present invention is therefore a crosslinked polyolefin rubber obtained by the action, on the ethylene/propylene and/or 1-butene copolymer defined above, of at least one peroxide in a proportion approximately from 0.5% to 2% by weight relative to the copolymer, at a temperature of approximately between 160° C. and 250° C. and for a period of approximately between 2 and 20 minutes or else by grafting an alkoxysilane, followed by the hydrolysis of the graft copolymer in the presence, if appropriate, of a hydrolysis catalyst such as dibutyltin dilaurate. As is well known to people skilled in the art in the case of the crosslinking of olefin polymers, the proportion of the peroxide or of alkoxysilane to be employed and the crosslinking temperature and time (the time being proportionately shorter the higher the temperature) are adapted to suit the nature of the peroxide or of the alkoxysilane employed and of the olefin polymer. In the case of the present invention it is preferable, depending on the main uses of the crosslinked rubber, that the crosslinking conditions should be adapted so that the gel content (determined according to ASTM standard D 2765-75) of the crosslinked rubber should be approximately between 70 and 90% by weight. Among the peroxides which can be employed for this crosslinking there may be mentioned benzoyl, dicumyl, tert-butyl, tert-amyl and lauroyl peroxides and 1,3-bis(tert-butylperoxyisopropyl)benzene and their mixtures. Up to 1% by weight (based on the copolymer) of sulphur and up to 4% by weight of zinc oxide may be added to the peroxide. Vinyltrimethoxysilane may be mentioned especially among the alkoxysilanes which can be employed.

After crosslinking using a peroxide system or else using grafting of an alkoxysilane followed by the hydrolysis of the graft copolymer obtained, the copolymers according to the invention have a very satisfactory property compromise, such as:

a Shore A hardness of approximately between 60 and 82;

an elongation at break of at least approximately 600% and generally between 600 and 1000%;

a tensile strength of between 60 and 150 daN/cm$^2$;

a Mattia flexure (determined according to NFT standard 46016 (ASTM D 813) not exceeding approximately 12 mm of notch after $10^5$ flexures It has been noted that when the gel content of the crosslinked rubber exceeds 90% its elongation at break decreases considerably.

The copolymers according to the invention are also suitable, after crosslinking and conversion by extrusion, injection or compression techniques, for the manufacture of industrial articles such as seals, shoe components, flexible tubing, damping components, profiles for the building and motor vehicle industry, and the like.

The examples below are given by way of illustration without limiting the present invention.

EXAMPLE 1

A catalyst is prepared as follows in a glass round bottom flask fitted with a stirrer and supporting a condenser, under nitrogen atmosphere. The various reactants are introduced at such a rate that the reaction mixture is maintained at a temperature of between 15° and 60° C. The preparation takes approximately one hour.

Into the round bottom flask are introduced successively, with stirring and at room temperature, 400 millimoles of 1,2-dichloroethane, 76 millimoles of 1-hexene, then 10 millimoles of TiCl$_4$ (diluted to 1 mole/liter in a C$_{10}$–C$_{12}$ saturated aliphatic hydrocarbon cut employed as inert solvent) and, lastly, 60 millimoles of dichloroethylaluminium.

Stirring is continued for 30 to 45 minutes and 100 ml of the same inert solvent are added followed, dropwise, by 60 millimoles of n-butylethylmagnesium. The temperature rises by approximately 40° C. The mixture is allowed to cool to room temperature and 10 millimoles of vanadium oxytrichloride are added. The inert solvent is added so as to obtain the catalyst in suspension at a concentration of 50 millimoles/liter of titanium and vanadium.

The terpolymerisation of a mixture of 40% of ethylene, 35% of propylene and 25% of 1-butene (mol %) at a temperature of 200° C. and at a pressure of 800 bars is carried out in a plant operating continuously and comprising a reactor fed with monomers by means of compressors and with a catalyst system by means of a high-pressure pump, a separator which the reaction mixture originating from the reactor enters after decompression to 250 bars, and a hopper which the copolymer present in the bottom of the separator enters after a decompression to a value of approximately 10 bars.

The catalyst system comprises the catalyst as prepared above and the triethylaluminium (25 mol %)methylsilanolatodiisobutylaluminium (75 mol %) activator, the atomic ratio of Al (of the activator) to the sum of Ti+V (of the catalyst) being 20.

13.8 kg of terpolymer are collected per millimole of titanium and vanadium, which has a relative density of 0.884, a melt index (measured according to ASTM standard D 1238-condition E) of 7.3 dg/min and a crystallinity (measured by X-ray diffraction) of 14%. Carbon 13 nuclear magnetic resonance analysis of this terpolymer has made it possible to determine the following molar content of comonomers:

propylene: 8.5%
1-butene: 6%

EXAMPLE 2

Figure 2:
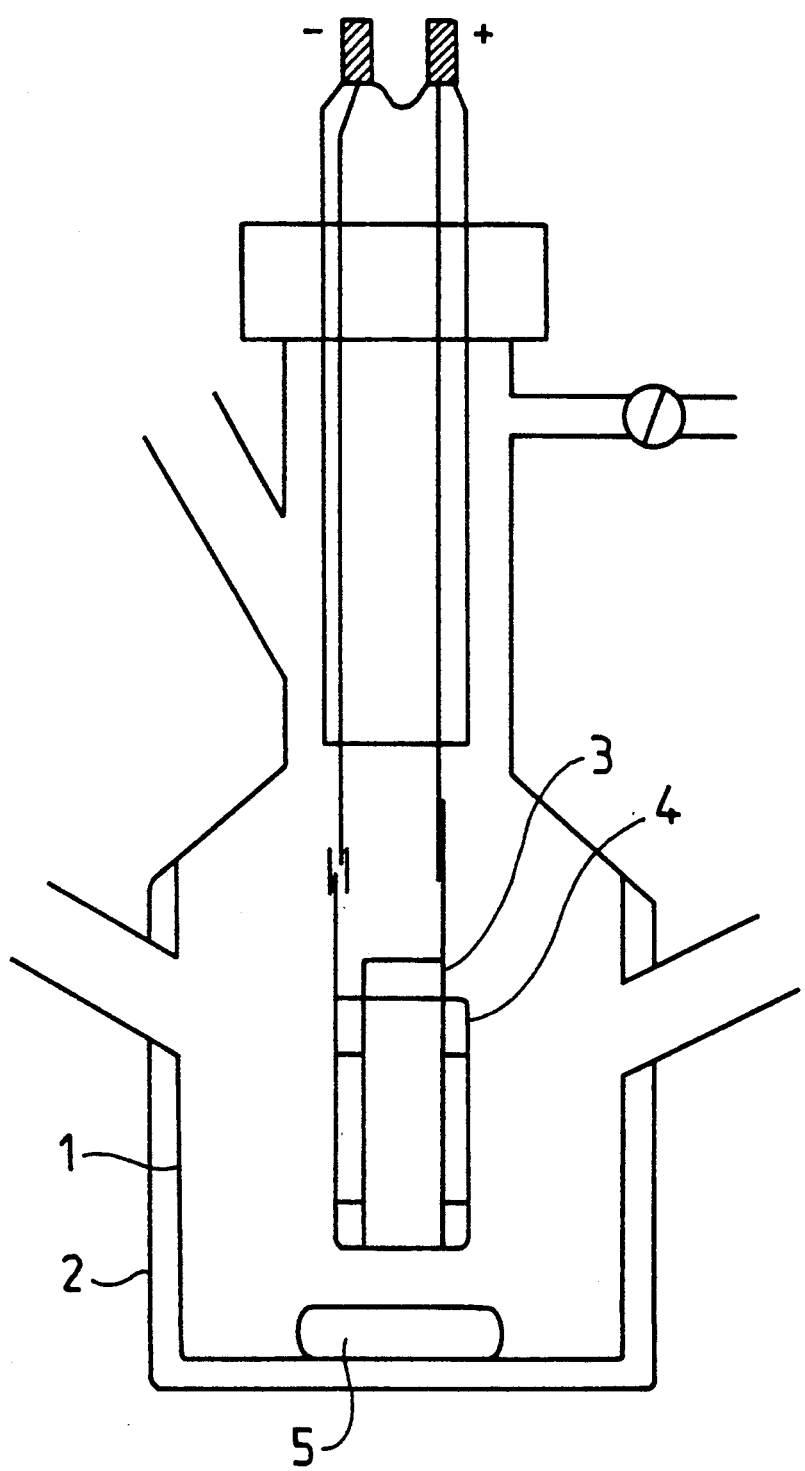
FIG. 2 is a diagramatic representation of an electrolytic cell in which a catalyst used to prepare the polyolefin rubbers of the present invention may be prepared.

A catalyst component is prepared as follows in an electrolysis cell shown diagrammatically in FIG. 2, which is appended. The body of the cell (1) is equipped with a jacket (2) allowing the temperature to be controlled. The anode (3) and the cathode (4) are cylindrical and coaxial. The reaction mixture is stirred magnetically by means of the bar (5). The catalyst component is prepared under inert atmosphere. The operation is carried out at controlled cathode voltage: the electrolysis is carried out by applying a constant voltage of 70 volts between, on the one hand, the aluminium anode and, on the other hand, the cathode, which consists of a platinum basket. The operating conditions are as follows:

solvent: 35 ml of 1,2-dichloroethane;
titanium compound subjected to reduction: 10 millimoles of titanium tetrachloride;
conductivity additive: 8 millimoles of 1-hexene;
quantity of electricity which has passed through the electrolyte at the end of the preparation: 30 millifaradays.

The catalyst component thus obtained is first of all treated by the addition of 60 millimoles of n-butylethylmagnesium and then of 10 millimoles of vanadium oxychloride. The resulting catalyst is then employed as follows for the terpolymerisation of a mixture of 35% by volume of ethylene, 40% by volume of propylene and 25% by volume of 1-butene.

The polymerisation plant operates continuously and comprises a thermostated stirred autoclave reactor fed with a mixture of ethylene and α-olefin by means of 2 compressors arranged in series, the second compressor also receiving the unreacted monomers originating from a separator into which the product from the reactor flows continuously. The separator is arranged following an expansion valve situated at the reactor outlet and is kept at a pressure of approximately 250 bars. The polymer collected at the bottom of the separator is introduced, through an expansion valve, into a hopper from which the polymer, separated at a pressure of approximately 10 bars, flows into an extruder. The gases originating from the hopper are recycled towards the entry of the first compressor.

The mixture of ethylene and α-olefin is introduced continuously into the reactor, into which is also admitted the catalyst system comprising, on the one hand, the catalyst such as is prepared above and, on the other hand, the triethylaluminium (25 mol %)-methylsilanolatodiisobutylaluminium (75 mol %) activator, the molar ratio Al/(Ti+V) being equal to 20. The polymerisation is carried out at 225° C. at a pressure of 800 bars and in the absence of chain transfer agent.

12.5 kg of terpolymer are collected per millimole of titanium and vanadium, which has a relative density of 0.882 and a melt index (measured according to ASTM standard D 1238, condition E) of 8.8 dg/min. Carbon 13 nuclear magnetic resonance analysis of this terpolymer has made it possible to determine the following molar contents of comonomers:
propylene: 11.1%
1-butene: 4.5%

EXAMPLES 3 to 8

The terpolymerisation of ethylene, propylene and 1-butene is carried out in a plant identical with that of the preceding examples, except for the fact that the reactor comprises three zones operating at temperatures $T_1$, $T_2$ and $T_3$ (expressed in degrees Celsius) shown in Table I below. The polymerisation is carried out at a pressure of 680 bars (except in Example 8: 700 bars) and in the presence of the proportions (expressed as a percentage by volume relative to the monomers) of nitrogen and hydrogen which are shown in Table I. The proportions by volume of propylene and 1-butene in the mixture of monomers, headed $C_3$ and $C_4$ respectively and expressed as percentages, are also shown in Table I. The monomer mix feed is distributed as follows: 60% into the first zone, 35% into the second zone and 5% into the third zone.

The catalyst system injected into each zone comprises, on the one hand, the dimethylethyldiethylsiloxalane activator and, on the other hand, the compound of formula $TiCl_3.1/3\ AlCl_3$. $VCl_3$ in quantities which are respectively such as to make the atomic ratio $Al/Ti+V$ equal to 3.

TABLE I

| Example | $T_1$ | $T_2$ | $T_3$ | $N_2$ | $H_2$ | $C_3$ | $C_4$ |
|---|---|---|---|---|---|---|---|
| 3 | 214 | 216 | 253 | 6 | 0 | 19.3 | 40.5 |
| 4 | 200 | 220 | 260 | 5 | 0 | 36.5 | 31.7 |
| 5 | 175 | 217 | 250 | 5 | 0.009 | 17 | 45 |
| 6 | 174 | 201 | 244 | 6 | 0 | 27 | 37 |
| 7 | 169 | 200 | 245 | 6 | 0 | 27 | 37 |
| 8 | 175 | 225 | 247 | 5 | 0.002 | 28.5 | 39.8 |

The terpolymers obtained by this manufacturing process are then analysed to determine:
their relative density d, measured according to ASTM standard D-1505
their melt index MI, measured according to ASTM standard D-1238 (condition E) and expressed in dg/min,
their crystalline melting point J, expressed in degrees Celsius and measured according to the process described above,
their degree of residual crystallinity C, expressed as a percentage of the total terpolymer and measured as shown before,
their polydispersity index Mw/Mn, calculated from weight- and number-average molecular masses determined by gel permeation chromatography,
their molar contents p and b of propylene and 1-butene in the terpolymer respectively, expressed as percentages and determined by carbon 13 nuclear magnetic resonance,
their average geometric molecular mass Mg, expressed in kg/mole and determined by calculation from gel permeation chromatography measurements according to the definition given above.

The combined analytical results are shown in Table II.

TABLE II

| Example | d | M.I. | J | C | Mw/Mn | p | b | Mg |
|---|---|---|---|---|---|---|---|---|
| 3 | 0.8848 | 4.1 | 109 | 14 | 4.5 | 6.4 | 5.6 | 46 |
| 4 | 0.8830 | 3.8 | 120 | 15 | 4.8 | 10.3 | 6.0 | 40 |
| 5 | 0.8810 | 1.2 | 107 | 11 | 4.7 | 6.7 | 8.7 | 65 |
| 6 | 0.8796 | 1.7 | 106 | 13 | 6.0 | 9.5 | 5.6 | 48 |
| 7 | 0.8774 | 1.7 | 104 | 10 | 5.2 | 9.6 | 6.2 | 48 |
| 8 | 0.8716 | 2.6 | 109 | 6 | 4.7 | 11.6 | 9.5 | 58 |

In order to determine the utility value of the terpolymers obtained, each terpolymer is mixed dry with 1.1% of its own weight of a peroxide marketed under the name Perkadox Y 14/90, and the mixture is then placed at 80° C. in a Farrel type mixer and compounded for 150 seconds to make its temperature reach 130° C. by self-heating. At this temperature the mixture homogenised in this manner is taken out of the mixer and is then reground after preforming in a cold press. The reground mixture is calendered at 130° C. for 150 seconds and then a sheet is produced in a press at 130° C. before being heated to 180° C. for 15 minutes so that its crosslinking may take place. The sheet is then cooled and cut into samples on which the following are measured:
the Shore A hardness,
the elongation at break EB (expressed in %) and the tensile strength TS (expressed in daN/cm$^2$), determined according to ASTM standard D-638,
the Mattia flexure, determined according to NFT standard, 46016 (ASTM D 813) and expressed in mm of notch after $10^5$ flexures.

The results of these measurements appear in Table III below. Furthermore, the gel content, measured according to ASTM standard D 2765-75, is equal to 85% by weight in each case.

EXAMPLES 9 to 11 (comparative)

The following are considered in succession:
an ethylene/1-butene copolymer marketed by Mitsui under the name Tafmer P 4085 (Example 9),
an ethylene/propylene copolymer marketed by Mitsui under the name Tafmer P 480 (Example 10), and
an ethylene/propylene copolymer marketed by Montedison under the name Dutral CO 034 (Example 11).

These products were analysed like those of Examples 3 to 8. Their characteristics are collated in Table IV below. They were also crosslinked using peroxide in the same conditions as the products of Examples 3 to 8, and the results of the measurements carried out on sheets appear in Table III.

TABLE III

| Example | 4 | 5 | 8 | 9 | 10 | 11 |
|---|---|---|---|---|---|---|
| Shore A | 80 | 81 | 65 | 86 | 62 | 60 |
| TS | 120 | 110 | 76 | 140 | 30 | 32 |
| EB | 620 | 600 | 950 | 530 | 410 | 590 |
| Mattia | 10 | 7 | 0 | 23 | 0 | 0 |

TABLE IV

| Example | d | M.I. | J | C | Mw/Mn | p | b | Mg |
|---|---|---|---|---|---|---|---|---|
| 9 | 0.8846 | 3.4 | 74 | 10 | 2.6 | 0 | 10.3 | 64 |
| 10 | 0.8634 | 0.9 | (*) | 0 | 2.6 | 10.4 | 0 | 92 |
| 11 | 0.8656 | 0.6 | (*) | 0 | 2.2 | 22 | 0 | 94 |

(*) not determinable in view of the absence of residual crystallinity

EXAMPLES 12 to 14

The copolymerisation of ethylene and propylene at a pressure of 800 bars, in the absence of hydrogen, is carried out in a plant identical with that of Examples 3 to 8. The catalyst system employed is the same as that of Examples 3 to 8. Table V collates, on the one hand, the conditions of manufacture and, on the other hand, the results of analysis of the copolymers obtained.

TABLE V

| Example | $T_1$ | $T_2$ | $T_3$ | $N_2$ | $C_3$ |
|---|---|---|---|---|---|
| 12 | 208 | 232 | 255 | 5 | 80 |
| 13 | 188 | 229 | 241 | 4.4 | 74 |
| 14 | 182 | 235 | 255 | 5.2 | 77 |

| Example | d | M.I. | J | Mw/Mn | p | Mg |
|---|---|---|---|---|---|---|
| 12 | 0.8790 | 2.1 | 121 | 7.0 | 15.1 | 44 |
| 13 | 0.8824 | 0.8 | 120 | 6.7 | 13.4 | 60 |
| 14 | 0.8768 | 4.3 | 122 | 6.7 | 16.0 | 39 |

EXAMPLE 15

A mixture of 21% by volume of ethylene and 79% by volume of 1-butene is copolymerised in the presence of 50% by volume of nitrogen relative to the said mixture, in an autoclave reactor maintained at a temperature of 175° C. and at a pressure of 800 bars. The catalyst system employed comprises, on the one hand, a compound of formula $TiCl_3.1/3AlCl_3.2VCl_3$ and, on the other hand, tetraisobutylaluminoxane as activator in an atomic ratio Al/(Ti+V) equal to 4. The copolymer obtained has the following characteristics:

| | |
|---|---|
| d = 0.8709 | M.I. = 1.1 dg/min |
| Mw/Mn = 4.7 | Mg = 66,000 |
| J = 116° C. | b = 19.1% |

EXAMPLE 16

The terpolymer of Example 5 is compounded for 5 minutes at 150° C. and is then compression-moulded into sheets at 160° C., first for 2 minutes at a low pressure and then for 3 minutes at 200 bars, and finally in a cold press.

The properties measured on sheets are the following:

| | |
|---|---|
| Shore A hardness: | 75 |
| TS (daN/cm$^2$): | 120 |
| EB (%): | 810 |

EXAMPLES 17 to 20

The terpolymer of Example 8, mixed where appropriate (Examples 18 to 20) with y% by weight of powdered stearic acid marketed under the name Baion AC, is compression-moulded into sheets at 200° C. The following are measured on these sheets:
adhesiveness to the touch,
breaking energy at −20° C., expressed in joules and determined in the multiaxial impact test according to NFT standard 51 118,
the elongation at break, expressed in % and determined according to NFT standard 51 034,
the Shore A hardness.

The results of the measurements carried out are collated in Table VI below.

TABLE VI

| Example | y | Tack | BE | EB | Hardness |
|---|---|---|---|---|---|
| 17 | 0 | yes | 44 | 950 | 51 |
| 18 | 2 | yes | n.d. | 1070 | 52 |
| 19 | 5 | no | 80 | n.d. | 58 |
| 20 | 10 | no | 70 | 970 | 65 |

We claim:

1. Polyolefin rubber consisting of an ethylene/propylene and/or 1-butene copolymer, which has a melt index of between 0.3 and 15 dg/min and a relative density of between 0.860 and 0.885, comprising from 74 to 91 mole % of units derived from ethylene and from 9 to 26 mol % of units derived from propylene and/or 1-butene, characterized by a crystalline melting point J of between 100° and 125° C. and a degree of residual crystallinity of between 2% and 15%.

2. Polyolefin rubber according to claim 1, in the form of granules whose surface is coated with silicone oil, a nonionic surface-active agent, a fatty acid or a fatty acid salt.

3. Polyolefin rubber according to claim 1 or claim 2, characterised in that the polyolefin rubber has a polydispersity index of between 3.5 and 15.

4. Polyolefin rubber according to claim 1, characterised in that the polyolefin rubber has an average geometric molecular mass of between 35 and 70 kg/mole.

5. Polyolefin rubber according to claim 1, characterised in that the relationship between relative density d and molar content x of the polyolefin rubber, expressed as a percentage, of units derived from propylene and from 1-butene is expressed by the double equation:

$$0.9084 \leq d + 0.002\ x \leq 0.918.$$

6. Crosslinked rubber comprising polyolefin rubber according to claim 1 crosslinked with a system based on peroxide or alkoxysilane.

7. Crosslinked rubber according to claim 6, characterised in that the crosslinked polyolefin rubber has:
a Shore A hardness of between 60 and 82,
an elongation of break of between 600% and 1000%,
a tensile strength of between 60 and 150 daN/cm$^2$, and
a Mattia flexure not exceeding 12 mm of notch after $10^5$ flexures.

8. Process for obtaining the polyolefin rubber according to claim 1, consisting in copolymerising, at a temperature of 150° to 300° C. and at a pressure of 400 to 2000 bars, a gas stream containing 15 to 42% by volume of ethylene and from 58% to 85% by volume of propylene and/or 1-butene, in the presence of a Ziegler catalyst system comprising, on the one hand, at least one compound of a transition metal of groups IVB, VB, VIB and VIII of the Periodic Classification and, on the other hand, at least one organoaluminium compound and, if appropriate, in the presence of at least one chain transfer agent.

9. Process according to claim 8, characterised in that the composition of the gas stream subjected to the copolymerisation is such that the volume ratio of propylene/1-butene exceeds 0.3.

* * * * *